(12) United States Patent
Griffith et al.

(10) Patent No.: US 7,567,374 B2
(45) Date of Patent: Jul. 28, 2009

(54) DEFORMABLE MIRRORS

(75) Inventors: Michael Stewart Griffith, Chelmsford (GB); Sharon Radcliffe, Chelmsford (GB); Charles Leslie Laycock, Chelmsford (GB); Andrew Graham McCarthy, Chelmsford (GB)

(73) Assignee: BAE Systems plc, London (GB)

( * ) Notice: Subject to any disclaimer, the term of this patent is extended or adjusted under 35 U.S.C. 154(b) by 397 days.

(21) Appl. No.: 11/630,252

(22) PCT Filed: Jun. 22, 2005

(86) PCT No.: PCT/GB2005/002477

§ 371 (c)(1),
(2), (4) Date: Dec. 21, 2006

(87) PCT Pub. No.: WO2005/124425

PCT Pub. Date: Dec. 29, 2005

(65) Prior Publication Data

US 2008/0030824 A1    Feb. 7, 2008

(30) Foreign Application Priority Data

Jun. 22, 2004  (EP) .................................. 04253727
Jun. 22, 2004  (GB) .................................. 0413952.3
Feb. 15, 2005  (GB) .................................. 0503115.8

(51) Int. Cl.
  *G02B 26/00*   (2006.01)
  *G02B 26/08*   (2006.01)
  *G02F 1/00*    (2006.01)

(52) U.S. Cl. ........................ 359/291; 359/198; 359/237

(58) Field of Classification Search ......... 359/290–292, 359/295, 223–225, 245, 260–263, 298, 198, 359/301–303, 317–318, 237, 242
See application file for complete search history.
eb;;l

(56) References Cited

U.S. PATENT DOCUMENTS 3,904,274 A    9/1975    Feinlieb (Continued)

FOREIGN PATENT DOCUMENTS

DE         199 17 519 A1    4/1999

(Continued)

OTHER PUBLICATIONS

Hua Wei Zhao et al: Prototype Bimorph Mirror for the AAT Adaptive Optics System Proceedings of the SPIE, SPIE, Bellingham, Va., US, vol. 3126, Jul. 30, 1997, pp. 384-390, XP002951245; ISSN: 0277-786X.

(Continued)

*Primary Examiner*—Scott J Sugarman
*Assistant Examiner*—Dawayne A Pinkney
(74) *Attorney, Agent, or Firm*—Crowell & Moring LLP

(57) ABSTRACT

The invention resides in the innovative use of deposition techniques in deformable mirrors. The use of deposition techniques allows contact pads for electrodes to be located wherever convenient. When applied to bimorph mirrors the invention enables both electro-restrictive layers to become active, increasing the stroke of the deformable mirror whilst retaining temperature insensitivity. A controllably-deformable mirror according to the invention comprises a deposition layer; a first electro-restrictive plate; a mirror surface; and a plurality of electrodes comprising a set of electrodes defined as regions on a first surface of the first electro-restrictive plate, the set of electrodes comprising a first electrode and a second electrode; and a common electrode on a second surface of the first electro-restrictive plate.

36 Claims, 10 Drawing Sheets

U.S. PATENT DOCUMENTS

| | | | |
|---|---|---|---|
| 5,099,353 | A | 3/1992 | Hornbeck |
| 5,602,671 | A | 2/1997 | Hornbeck |
| 5,936,758 | A | 8/1999 | Fisher et al. |
| 5,939,785 | A | 8/1999 | Klonis et al. |
| 6,447,126 | B1 | 9/2002 | Hornbeck |
| 6,874,897 | B2 * | 4/2005 | Graves et al. ............... 359/846 |
| 7,034,984 | B2 * | 4/2006 | Pan et al. .................... 359/291 |

FOREIGN PATENT DOCUMENTS

| | | | |
|---|---|---|---|
| FR | 2 615 001 | A | 11/1988 |
| GB | 1 517 469 | A | 7/1978 |
| JP | 11072605 | A1 | 3/1999 |
| SU | 1 695 252 | A | 11/1991 |
| WO | WO 02/059674 | A1 | 8/2002 |

OTHER PUBLICATIONS

Adaptive Optical System Technologies II Aug. 22-26, 2002 Waikoloa, HI, USA, vol. 4839, 2003, pp. 647-658; XP002348511, Proceedings of the SPIE—The International Society for Optical Engineering SPIE-Int. Soc. Opt. Eng USA ISSN:0277-786X.
Low-Cost Bimorph Mirrors in Adaptive Optics, Edric Mark Ellis; Imperial College of Science, Technology and Medicine—University of London, Apr. 1999, pp. 119-120.

* cited by examiner

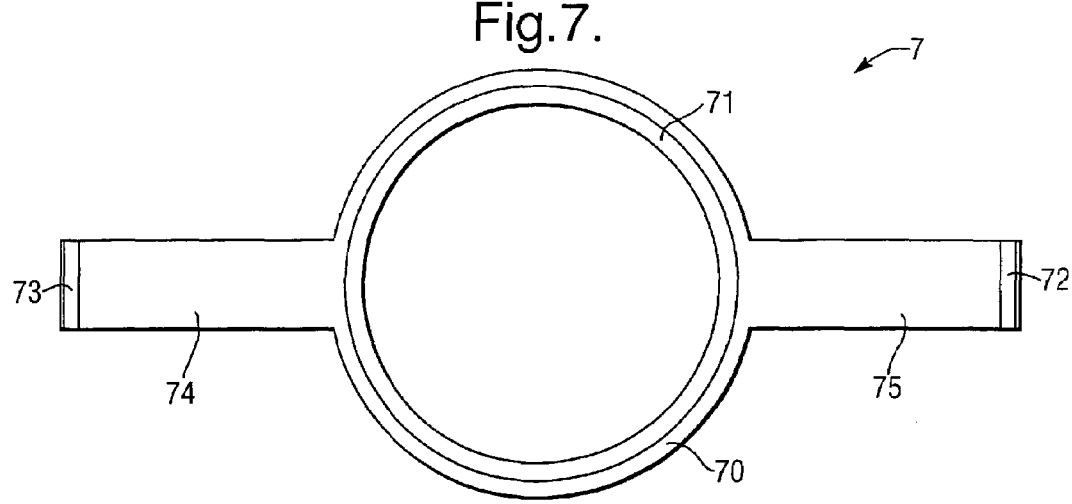
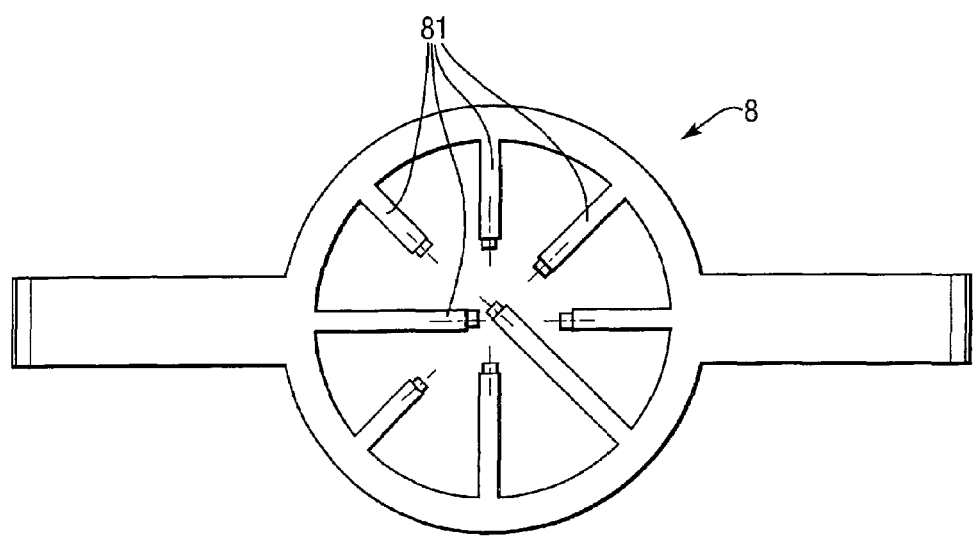

DEFORMABLE MIRRORS

This invention relates to an improved deformable-mirror, and more particularly, though not exclusively, to a deformable mirror comprising a passivation layer.

Deformable mirrors are often used in the field of adaptive optics. For example, phase distortions in a signal may be sensed by a wavefront sensor and these distortions may be corrected for by an adaptive mirror. Such adaptive mirrors may be employed in numerous fields, including:

imaging, for example adaptive mirrors are used in astronomy to improve the resolution of earth-based telescopes that are otherwise affected by atmospheric distortions;

laser sensing, where the amount of laser light that can be delivered onto a target is significantly increased by using an adaptive mirror to correct for atmospheric distortions—this enables either better information to be obtained or objects to be identified at a greater range; and laser generation, where an adaptive mirror can be used intracavity within a high power laser to counter the thermal blooming that can be otherwise induced by the high concentration of laser light inside the cavity.

The two main operational parameters of a deformable mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke would be maximised.

One known type of deformable mirror comprises a layer of an active electro-restrictive material glued to a passive mirror substrate layer. The electro-restrictive material can be a piezo-electric material such as PZT, a ceramic material comprised of lead, zinc, titanium and oxygen. A possible alternative is PMN, an electro-restrictive material comprised of lead, magnesium, niobium and oxygen. On application of an electric field, the electro-restrictive material deforms. This deformation can be used to deform the mirror in a controllable manner. By placing an array of electrodes on one surface of the active layer, and a continuous electrode on its other surface, the applied electric field can be varied such that a degree of control can be exerted over the mirror deformation.

Since the passive substrate and the electro-restrictive layer are made from different materials, their response to changes in the ambient temperature will differ, creating an additional bending movement that must be compensated for by the mirror. This reduces the effective stroke of the mirror.

A possible solution to this problem is to use a second piece of passive electro-restrictive material as the mirror substrate. This avoids the above problem since both the passive substrate and the active layer respond in the same way to a change in ambient temperature. However, standard, readily available forms of electro-restrictive materials such as PZT are ceramic, and cannot easily be polished to a mirror finish since they are too granular. Only some advanced and expensive forms of PZT ceramic can be polished directly. In WO 02/059674, M J Northcott and J E Graves disclose a method for forming a mirror surface on a passive PZT substrate by epoxy replication, wherein the mirror layer is first formed separately and then adhered to the surface of the passive PZT layer. To ensure that the two pieces are as near identical as possible, thus minimising the thermal sensitivity of the mirror, electrode layers are formed on both the passive and the active PZT layers. It is notable that there remains a passive PZT layer.

A number of problems exist with the prior art mirror described above. Firstly, since epoxy is used to attach the mirror to the deforming structure, the deformable mirror is not suitable for high-power applications: the local high temperatures created in the mirror when it is subjected to high power radiation would irreparably damage the epoxy. Even for low-power applications, the epoxy bond is weak and can result in a short working life for the deformable mirror. However, the epoxy cannot simply be removed since a mirror surface cannot be applied directly to the PZT plate. Secondly, the stroke is not at a maximum since one layer of PZT must remain passive. The method of manufacture does not allow for a plurality of electrodes to be placed on all surfaces of the PZT, and so an electric field cannot be applied independently across each PZT layer. Furthermore, the array of electrodes must be soldered to individually, with a wire at the back of the mirror for each electrode. This method of connection is inconvenient if the mirror is to be used in multiple driver systems or mounts, or if it is to be used in a variety of applications, since the soldering process can be a very delicate task when there are a large number of electrodes. The process is also time consuming: it may take several days for the soldering to be completed if there are a large number of electrodes.

Against this background, one object of the invention is to substantially reduce or overcome some of the above-mentioned drawbacks. It is a further object of the invention to provide a low-cost deformable mirror that can be easily adapted for use in any application or driver system. Another object of the present invention is to provide a temperature-insensitive deformable mirror with a greater stroke than prior-known mirrors.

In broad terms, the present invention resides in the innovative use of passivation techniques in deformable mirrors. The use of passivation allows contacts for the electrodes to be located wherever convenient. When applied to bimorph mirrors the invention enables both electro-restrictive layers to become active, increasing the stroke of the deformable mirror whilst retaining the advantageous temperature insensitivity of the prior-known mirror of WO 02/059674.

According to a first aspect of the invention, there is provided a controllably-deformable mirror comprising a first electro-restrictive plate; a mirror surface; a plurality of electrodes comprising a set of electrodes defined as regions on a first surface of the first electro-restrictive plate, the set of electrodes comprising a first electrode and a second electrode; a common electrode on a second surface of the first electro-restrictive plate; and a passivation layer adapted to mutually insulate the set of electrodes. The passivation layer allows a bias voltage to be applied to each electrode in the set of electrodes independently by insulating each electrode from the other electrodes, and from any conducting tracks that may run across it.

Advantageously, the deposition layer confers a large degree of flexibility on the mirror design. Conveniently, the controllably-deformable mirror further comprises a set of contacts removed from the electrodes and positioned such that an external mirror-driver operable to apply voltages to the electrodes can be interchangeably electrically connected to the contacts, the set of contacts including a first contact electrically connected to the first electrode and a second contact electrically connected to the second electrode. Contacts to the electrodes can be made wherever may be convenient for the particular application of the mirror, and can be adapted to suit any preferred method of support or mirror-holder. For example, if the mirror is to be supported at its periphery, contact to the electrodes can be made from below. Alternatively, if the mirror is to be supported from below, contact to the electrodes can be made at the periphery of the mirror. There may be a set of conducting tracks to electrically connect the set of electrodes to the set of contacts, the set of conducting tracks being formed such that the passivation layer is interposed between the set of conducting tracks and the set of electrodes. This leads to further flexibility in the mirror design, since this layer allows the conducting tracks to be run across the set of electrodes. Thus, in contrast to the prior art mirror of WO 02/059674, embodiments of the present invention provide a compact deformable mirror with no need for trailing wires leading to each electrode.

Conveniently, the passivation layer and the set of conducting tracks are provided by a flexi-circuit. The flexi-circuit may comprise a first portion shaped to correspond with the shape of the first electro-restrictive plate and a second portion extending from the mirror to provide the set of contacts, the first portion being adapted to provide the passivation layer. The flexi-circuit may comprise a set of conducting copper tracks embedded in a polyimide substrate. The polyimide substrate is non-conducting, and thus, in this embodiment, the passivation layer may comprise polyimide. The flexi-circuit may be glued, or otherwise bonded, to the first surface of the first electro-restrictive plate, resulting in a particularly quick and simple construction method, since there is no need to provide an additional interconnect in order to operate the deformable mirror with an external mirror driver, and the steps of forming the passivation layer and forming the conducting tracks are both accomplished by the single step of bonding the passivation layer to the electro-restrictive plate.

There may be a second electro-restrictive plate attached to the first electro-restrictive plate such that the passivation layer is interposed between the first and second electro-restrictive plates. Advantageously, electrical connections can then be made to electrodes on both electro-restrictive plates, so that both electro-restrictive plates can be independently and actively deformed.

The passivation layer may comprise a deposition layer. Whilst the formation of a deposition layer is not as quick or as simple a process as the bonding of a flexi-circuit to the first electro-restrictive plate, the use of deposition techniques enables materials that better match the thermal properties of the mirror to be used for the passivation layer, and therefore leads to a more temperature insensitive mirror. Conveniently, the contacts can then be arranged in a peripheral region of the mirror at or near the circumference of the first electro-restrictive plate.

Optionally, the deposition layer is on the first surface of the first electro-restrictive plate. Optionally, the mirror surface is on the first surface of the first electro-restrictive plate. Conveniently, the deposition layer is interposed between the mirror surface and the first surface of the electro-restrictive plate. Where the invention is embodied in a bimorph deformable mirror, this arrangement allows both layers of electro-restrictive material to be independently active, since in prior known mirrors, such as that disclosed in WO 02/059674, it was not possible to incorporate a set of electrodes between the mirror surface and the upper electro-restrictive plate. Advantageously, this enhances the stroke of the mirror over the prior-art mirror. Alternatively, the mirror may further comprise a second electro-restrictive plate, and the deposition layer may be interposed between the first and second electro-restrictive plates.

Preferably, the deformable mirror also comprises a planarization layer on which the mirror surface is formed. The planarization layer obviates the need for prior-known techniques, such as epoxy replication, to be used before applying the mirror surface. Preferably, the planarization layer is formed by deposition techniques. The planarization layer may comprise any one of silicon dioxide and silicon nitride. Such materials are better able to deal with the conditions generated by exposure to high power radiation than epoxy. Thus the mirror is more versatile than those in which epoxy replication is used. Advantageously, the planarization layer smoothes out deviations from optical flatness such that a mirror surface can be formed. The planarization layer may be deposited above the passivation layer, or may be deposited directly onto the electro-restrictive plate. In the case of a unimorph mirror, the planarization layer may be used to form a passive substrate for the mirror.

Optionally, there may be a deposition layer formed symmetrically on the outer surfaces of both the first and second electro-restrictive plates. Advantageously, this balances the stresses caused by the formation of the deposition layers, and moreover allows the structure to be parallel polished, further enhancing the flatness of the as-made mirror.

In accordance with an exemplary embodiment of the invention, the passivation layer comprises silicon dioxide, and is between 16 μm and 20 μm thick, such that it is able to hold off a potential difference across it in the range of 800V to 1000V. In such an exemplary embodiment, the maximum bias voltage that can be safely applied to any one electrode is in the range of 400V to 500V, since a neighbouring electrode, or conducting track running across the electrode, may be at an equal bias voltage applied with opposite polarity (leading to a potential difference across the passivation layer in the range 800V to 1000V). The thickness of the planarization layer may lie in the range 5 μm to 30 μm, so as to be able to smooth out deviations from flatness in the surface to which it is applied. When the planarization layer is to be used as a passive substrate for a unimorph mirror, its thickness will be dependent on its mechanical properties. In such cases the planarization layer will be thicker so as to match the properties of the active layer.

Optionally, the mirror further comprises a flexi-circuit to electrically connect the contacts to a mirror driver. In this case, the flexi-circuit does not provide the passivation layer, but is used simply to provide a convenient interconnect between the contacts and an external mirror driver. Other forms of interconnect, such as rigid printed circuit board (PCB) interconnects, and wire bonders, may also be used to connect the mirror to an external mirror driver.

Optionally, the mirror is mounted in a deformable-mirror holder. The holder may comprise a support structure adapted to support the mirror from below. Advantageously, contact pads in the peripheral regions of the mirror are then easily accessible, thus facilitating electrical connections to external controls.

One of the disadvantages that unimorph or bimorph deformable mirrors in particular suffer from is the hysteresis effect associated with piezo-ceramics such as PZT.

Hysteresis in PZT arises from crystalline polarization and molecular effects. The absolute expansion of a PZT layer depends not only upon the voltage applied across the layer, but also on remnant polarization and therefore the recent history of the polarisation state, e.g. whether the PZT was previously energised by a higher or a lower field strength (and some other factors). Hysteresis is typically of the order of 10% to 15% of the commanded deformation. With hysteresis at such levels, use of unimorph or bimorph deformable mirrors has been limited to closed loop adaptive systems in which, due to continuous updating of the effects of applied deformations, hysteresis compensation is not necessarily required.

In preferred embodiments of the present invention, a controllably-deformable mirror is provided, further comprising a plurality of (preferably resistive) strain gauges provided in association with a layer of the mirror to provide information relating to deformation of the mirror. In particular, the strain gauges may be provided in regions of the mirror associated with electrodes.

Preferably, the strain gauges may be arranged as substantially mutually orthogonal pairs, or strain gauges may be provided in the form of a double spiral. However, in each case, the strain gauges are preferably deposited on or within a passivation layer of the mirror, wherever provided.

With strain gauges being used to accurately measure the bending strain resulting from the energising of particular electrodes, unimorph and bimorph deformable mirrors according to preferred embodiments of the present invention may be used in open loop adaptive systems.

According to a second aspect of the invention, there is provided a method of manufacturing a controllably-deformable mirror having an electro-restrictive plate, comprising the steps of:

(a) defining a set of electrodes, comprising a first electrode and a second electrode on a first surface of the electro-restrictive plate;

(b) depositing a passivation layer; and (c) applying a mirror surface.

Advantageously, the step of depositing a passivation layer uses deposition techniques, a technology well-established in other fields. This innovative use of known technology leads to a cheap and effective manufacturing process. Optionally, the method further comprises the step of depositing a planarization layer. The thickness of the as-deposited planarization layer may be in the range of 21 μm to 30 μm. Preferably, the step of applying a mirror surface to the layer comprises the steps of grinding and polishing the planarization layer to optical flatness.

The above and further features of the present invention are set forth in the appended claims and will be explained in the following by reference to various exemplary embodiments which are illustrated in the accompanying drawings in which:

FIG. 5 is a cross-sectional view of a third stage in the manufacture of the first embodiment of;

FIG. 7 is a plan view of a flexi-circuit that may be used in conjunction with the first embodiment;

FIG. 8 is a plan view of a further flexi-circuit that may be used in conjunction with the first embodiment;

In the following description, the same reference numerals as used in different Figures are used to designate same/like parts.

Figure 1:
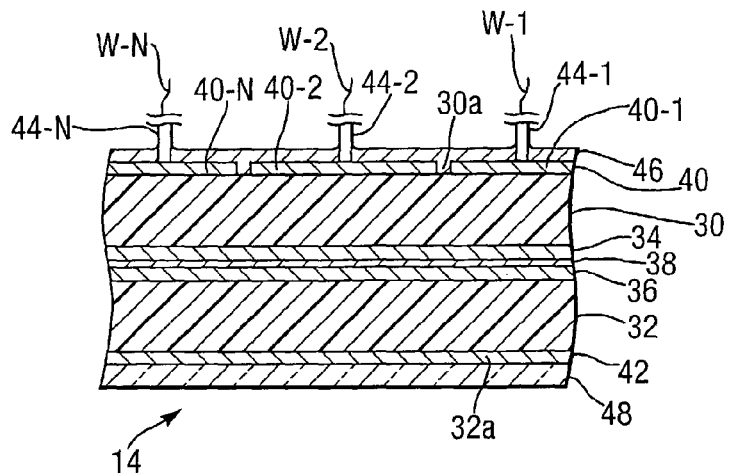
FIG. 1 is a cross-sectional view of a prior art deformable mirror.

FIG. 1 shows a prior art mirror 14 described in WO 02/059674. The mirror comprises two PZT discs 30 and 32, continuous electrodes 34, 36 and 42, segmented electrodes 40-N and mirror surface 48. These component layers are bonded together using epoxy 46 and 38. The PZT disc 32 closest to the mirror surface remains passive in this case because electrodes 36 and 42 are both continuous and an electric field cannot therefore be controllably applied to this disc. Instead, disc 32 is a passive substrate against which active disc 30 is able to create a deforming force. Disc 32 simply ensures thermal insensitivity of the mirror, since discs 32 and 30 expand in the same manner under a changing temperature. Similarly, electrode 42 only serves to ensure symmetry of the mirror, thereby further reducing the temperature sensitivity of the mirror 14. A number of wires W-1 to W-N extend from the back of the mirror to enable electrical connection to the mirror.

Figure 2:
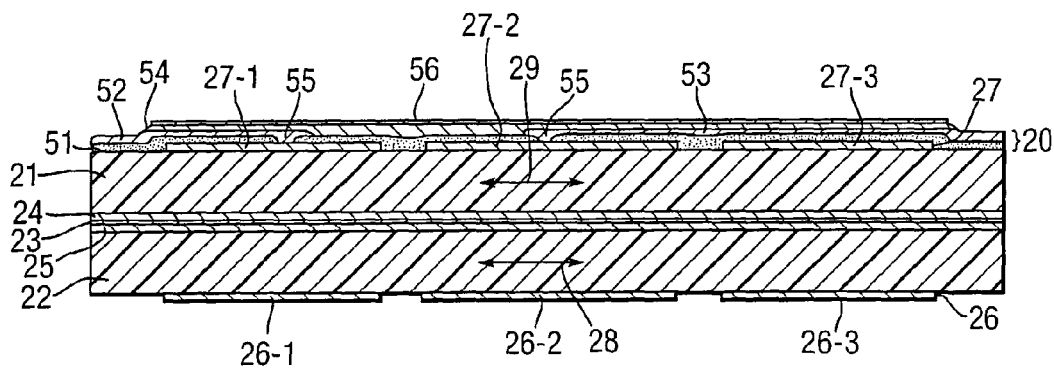
FIG. 2 is a cross-sectional view of a mirror according to a first embodiment of the invention.

In contrast to the prior art mirror 14, FIG. 2 shows a cross-sectional view of a controllably-deformable mirror 2 according to a first embodiment of the present invention. The mirror 2 comprises two discs of electro-restrictive material 21 and 22 that are bonded together with epoxy 23 with continuous electrodes 24 and 25 running between the two discs 21 and 22. The two discs 21 and 22 of electro-restrictive material can be, for example, PZT. It is to be noted that there are two sets of segmented electrodes 26 and 27 on the mirror, with one set 26 beneath the PZT discs, and one set 27 between the PZT discs and the mirror surface 56. The individual electrodes in the sets are labelled 26-1, 26-2 and 26-3, and 27-1, 27-2 and 27-3. It is to be noted that only three electrodes are shown for clarity. In fact, there may be any number of electrodes in each set. External drivers (not shown) are used to apply a voltage bias to the electrodes so as to deform the PZT discs 21 and 22. The configuration of the sets of electrodes 26 and 27 will change according to the application of the mirror as is well known in the art. Furthermore, both PZT discs 21 and 22 can be used to actively deform the mirror 2, enhancing the stroke of the mirror 2 over the prior art mirror 14, shown in FIG. 1, whilst retaining the temperature stability gained from the use of the two PZT discs. This is achieved through use of a deposition layer, indicated generally by 20, as will be described in more detail hereinafter.

The PZT discs 21 and 22 are poled parallel such that an electric field applied in the same direction to each disc will cause the discs to deform in the same way. This is indicated schematically by arrows 28 and 29. In the embodiment shown, with the common electrodes 24 and 25 between the two PZT discs 21 and 22, the electric field is applied to the discs in opposite directions, since the two common electrodes will be held at the same potential by the mirror driver. Thus when one disc expands, the other contracts. By applying a field in a controlled manner to each of the segmented electrodes in sets 26 and 27, the mirror 2 can be made to deform as desired, through techniques that are well known in the art.

Alternatively, the PZT discs can be poled in opposite directions (not shown). In this case, an electric field is applied to only one PZT disc at a time, and thus whilst one disc is actively deformed by the application of electric field, the other remains passive. In this way, a simpler drive scheme is possible, in which field is applied to one disc or the other, depending on the direction of movement required. Furthermore, the maximum safe field $V_s$ that can be applied to a PZT disc depends on the direction of the field relative to the poling direction of the disc. Since a field up to five times greater (5 $V_s$) can be safely applied along the poling direction than against it, the stroke of the mirror is not adversely affected by the use of such a simpler driving scheme. This will still result in a uniformly bipolar response.

Figure 3:
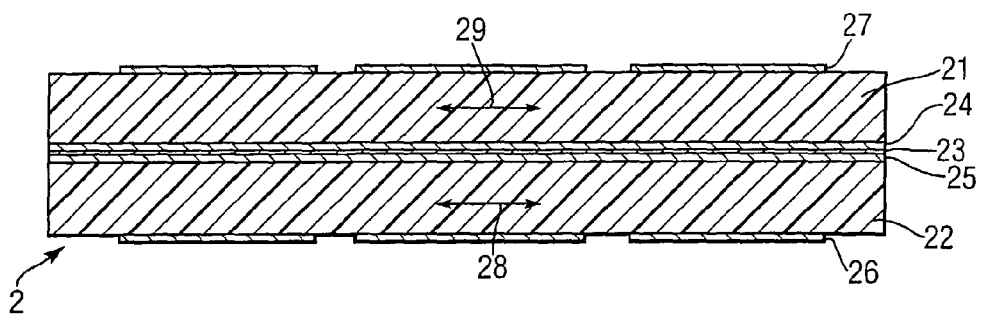
FIG. 3 is a cross-sectional view of a first stage in the manufacture of the first embodiment.

The method of manufacture of the embodiment shown in FIG. 2 will now be described such that the structure of mirror 2 may be better understood. FIG. 3 shows a first stage in the manufacture of mirror 2. Two identical discs of PZT 21 and 22 are bonded together with epoxy 23 such that they are poled parallel as indicated by arrows 28 and 29. Both include a wrap-around electrode (not shown) to enable electrical contact to the middle electrodes 24 and 25. Sets of segmented electrodes 27 and 26 on the top and bottom of the mirror are defined as regions on the surface of the PZT discs, such that local deformations can be effected.

Figure 4:
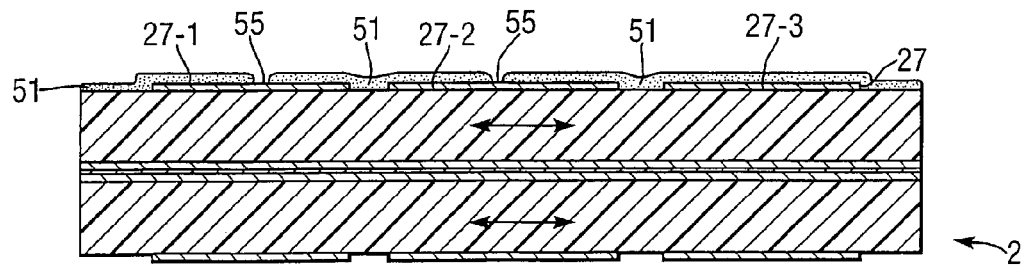
FIG. 4 is a cross-sectional view of a second stage in the manufacture of the first embodiment.

FIG. 4 shows a second stage in the manufacture of mirror 2. A passivation layer 51 has been has been applied to the upper set of segmented electrodes 27. The passivation layer 51 mutually insulates the electrodes 27-1, 27-2 and 27-3 and enables a voltage bias to be applied to each electrode independently. The passivation layer 51 may be silicon dioxide, polyimide, or any suitable insulating material. It can be applied by a number of deposition techniques to be described hereinafter. Vias 55 have been etched in the passivation layer 51 to allow access to the electrodes in set 27.

Figure 5:
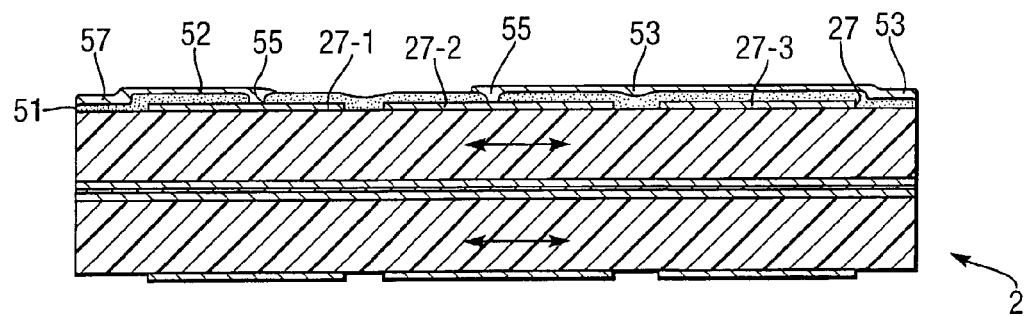

FIG. 5 shows a third stage in the manufacture of the mirror 2. Metallisation has been put down to run conducting tracks 52 and 53 to form contacts 57 and 58 at the rim of the PZT disc 21. Contacts 57 and 58 take the form of contact pads. For simplicity, only two tracks are shown: in fact, each electrode is connected to a contact on the rim of the mirror, and, as will be understood by the skilled reader, there may be many electrodes. The conducting tracks 57 and 58 make contact with the electrodes 27 at the vias 55. Note that track 53 runs above PZT electrode 27-3, but is stopped from making contact by the passivation layer 51. The thickness of the passivation layer 51 must therefore be sufficient to insulate, for example, an electrode 27-3 at $+V_m$ from a track 53 at $-V_m$, where $V_m$ is the maximum bias voltage expected to be applied. Typically a maximum voltage of 400-500V is applied to the electrodes. Given the breakdown voltage of silicon dioxide of approximately 50V/μm, the necessary thickness of the passivation layer is 16-20 μm. It is possible for higher voltages to be applied to the electrodes, in which case the passivation layer 51 would need to be thicker. However, 400-500V is the maximum voltage that can currently be effectively applied using cost efficient drivers. The thickness of the passivation layer 51 will also vary depending on the material used. The metallisation can be put down, for example, by evaporation through a mask.

Figure 6:
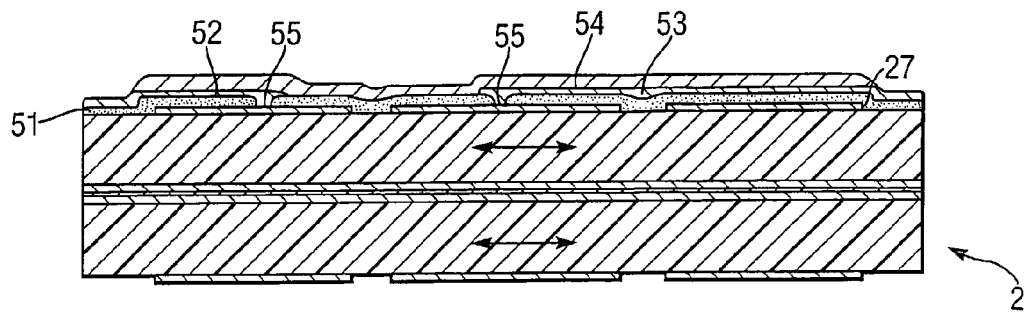
FIG. 6 is a cross-sectional view of a fourth stage in the manufacture of the first embodiment.

FIG. 6 shows a fourth stage in the manufacture of the mirror 2 in which a planarization layer 54 has been added. Layer 54 is applied so that any deviations from planarity created by the passivation layer 51 and the conducting tracks 52 and 53 can be removed by grinding and polishing. The passivation layer 51 is uneven since vias 55 are etched through it to enable access to the electrodes 27. The planarization layer 54 must therefore be at least as thick as the passivation layer 51, and preferably slightly thicker, so that there is a small amount of planarization material remaining after grinding and polishing. For a passivation layer 51 of thickness 16 μm to 20 μm, therefore, the thickness of the as-deposited planarization layer 54 is in the range 21 μm to 30 μm. After grinding and polishing, therefore, in the regions above the passivation layer 51, the remaining thickness of planarization material will vary from 5 μm to 10 μm. Above the vias 55, there will be a greater thickness of planarization material remaining. Suitable materials must be hard and able to be polished to optical flatness. Examples include silicon dioxide, silicon nitride and chemical vapour deposition silicon carbide (CVD SiC). The planarization layer 54 is applied using the deposition techniques described below.

Once the planarization layer 54 has been ground and polished, the mirror surface 56 can be applied. The specific material used for the mirror surface 56 will depend on the wavelength of the radiation to be reflected. The result is the embodiment shown in FIG. 2.

As described above, the planarization procedure is only carried out on the mirrored piece of PZT 21. This is adequate if it can be assumed that the deposition layer 20 will not affect bending or temperature sensitivity of the mirror 2. If more robust temperature invariance is required, the procedure can be carried out on both PZT discs. Applying the procedure symmetrically has the additional benefits that any stress built up during the application of the deposition layers will be equalised, and that the structure can be parallel polished, further improving the flatness of the as-made mirror 2.

The use of the deposition techniques enables contacts, such as pad 57, to be formed on the mirror 2 wherever may be convenient. Location of the contacts can easily be altered: the use of the passivation layer 51 allows conducting tracks, such as tracks 52 and 53, to be run across the electrodes 27 to any location. The contacts can therefore be placed according to the mounting of the mirror 2, or the application for the mirror 2. A particularly convenient position for the contacts is the peripheral region of the mirror. The contacts may be equally spaced around the circumference of the mirror, or could be grouped as may be convenient.

Contact can be achieved by using a wire bonder, as described in the Applicant's pending UK Patent Application No. 0412851.8. The interconnection PCB could either be a rigid PCB with solder pins or it could be a flexi-circuit. A possible shape for the flexi-circuit 7 is shown in FIG. 7. The flexi circuit is shaped as an annulus 70 from which two cables 74 and 75 extend. The flexi-circuit 7 has an array of bond pads 71 on the inside of the annulus 70 which map one-to-one with the array of contact pads (labelled 57 in FIG. 5) on the periphery of the bimorph mirror 2. At the other end, the flexi-circuit 7 has contacts in the form of bond pad arrays 72 and 73 designed to plug into a connector or similar standard arrangement. The flexi-circuit 7 shown has two flexible circuits emanating from the annulus, but its shape could differ depending on the desired use of the mirror 2.

For embodiments in which the bimorph mirror is to be mounted by clamping to the base structure, the clamp mechanism can also contain a pressure connector arrangement which clamps the flexi-circuit onto the array of contacts around the periphery of the mirror. Advantageously, this removes the need to make individual connections to each electrode.

Alternatively, a surface mount connector could be soldered directly to the contact pads at the periphery of the PZT disc. This could connect to a flex-cable or flexi-circuit to achieve the interconnect. A PCB edge connector is designed to interconnect a mother and daughter board, typically at right angles. The connector clamps onto an array of pads lined up at the edge of the board. A similar style connector with a flexi-circuit and flex cable added could be used to clamp onto the pads at the periphery of the PZT disc. Some types of flexi-circuit and flex-cable are designed to be soldered directly down onto an array of bond pads. If this technique is used, no clamping arrangement is necessary, but the process is likely to require special 'hot bar' tooling. The use of flexi-circuits, rather than, for example, ribbon cable, minimises the loading added by the interconnect.

FIG. 8 shows an alternative flexi-circuit 8 shaped to make contact with each electrode on a PZT disc that has not been planarized. Flexi-circuit 8 has finger-like portions 81 designed to make contact to the electrodes individually. This arrangement could be used, for example, for connecting to the set of electrodes 26 on the underside of the mirror 2 shown in FIG. 2.

Figure 9:
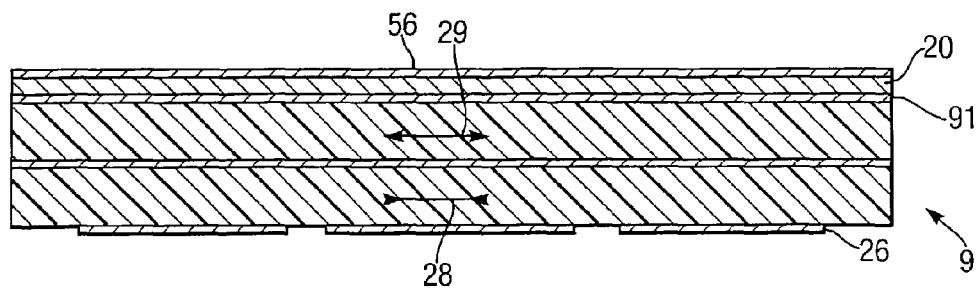
FIG. 9 is a cross-sectional view of a second embodiment of the invention.

FIG. 9 shows a mirror 9 according to a second embodiment of the invention in which the mirror surface 54 is formed onto a continuous electrode 91. In this case, it is only necessary to deposit a single deposition layer 20, which can then be polished to create an optically flat surface. In this embodiment, the mirror 9 is a true bimorph, in which two PZT discs poled in opposite directions are bonded together and the field is applied across both such that one will expand and one will contract, as indicated by arrows 28 and 29. Similarly, only a single deposition layer is needed when the mirror surface is to be formed onto a rough surface.

Figure 10:
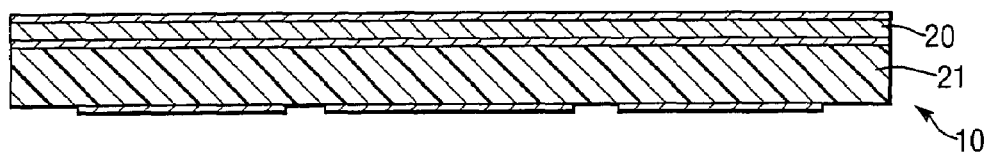
FIG. 10 is a cross-sectional view of a third embodiment of the invention.

FIG. 10 shows a mirror 10 according to a third embodiment of the invention in which a deposition layer 20 is used as a passive substrate for a unimorph mirror with only one PZT disc 21. This is possible where the unimorph mirror 10 is small and the mirror thickness is less than 1 mm thick. For larger mirrors, the time taken to deposit layer 20 is impractical and it becomes progressively difficult to deposit layers sufficiently thick that are of sufficient quality.

Figure 11:
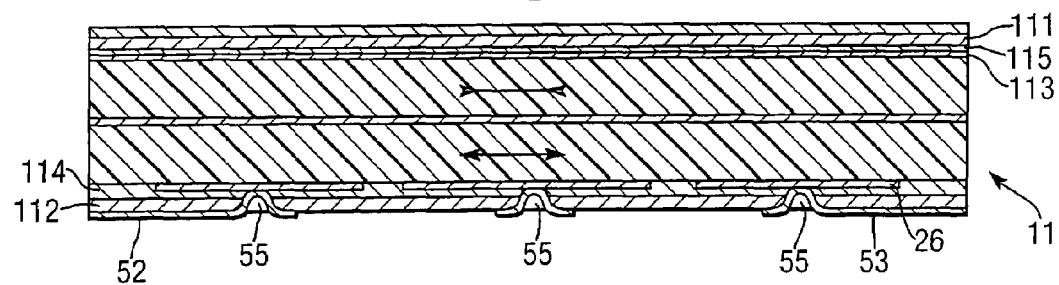
FIG. 11 is a cross-sectional view of a fourth embodiment of the invention.

FIG. 11 shows a fourth embodiment of the invention in which a symmetric bimorph mirror 11 is created by bonding two thin passive discs 111 and 112 of a hard material such as glass, fused silicon, silicon or CVD silicon carbide to the top and bottom surfaces of a standard bimorph mirror in which two PZT discs are bonded directly together, poled in opposite directions (as indicated by arrows 28 and 29), and the electric field applied across both discs. The mirror 11 has a set of electrodes 26 on the bottom surface of the structure, and a continuous electrode 113 on the top surface. Bonding is accomplished using, for example, epoxy 114 and 115. The epoxy 114, 115 can be applied by screen printing such that there is no epoxy directly beneath the vias 55. The thickness of the layers 111 and 112 will vary in dependence on the diameter of the mirror but in most cases will be between 0.5 mm and 1 mm. The hard material must be able to take a mirror finish. The structure is then parallel polished, and a mirror surface 56 applied to the top coating. Vias 55 are then etched in the bottom surface, and metallisation is put down to run tracks 52, 53 to contact pads around the outside of the mirror (not shown). The formation of vias 55 in the layer of hard material 112 can be accomplished, either before or after the layer is bonded to the standard bimorph, by etching or ion-beam milling. This embodiment is particularly insensitive to temperatures due to its symmetry. Furthermore, the use of parallel polishing enables the as-manufactured mirror to be substantially free from distortions.

In a further embodiment of the invention (not shown), the PZT plates are bonded together such that the common electrode for each plate is facing outwards, and the sets of electrodes are between the two plates. Electrical contact to the sets of electrodes can be established either by passivating and planarising the two sets of electrodes before the plates are bonded together, so that a set of peripheral contact pads can be used; or by using a flexi-circuit 8 (as shown in FIG. 9) sandwiched between the PZT plates. The flexi-circuit is three layered, with the outer layers arranged to make contact to the electrodes on the inner surfaces of the PZT plates, and the inner layer providing the tracking and interconnections to an external control driver. Two passive discs are then applied to the outer surfaces of the structure, as in the embodiment shown in FIG. 11, although without vias. The structure can then be parallel polished to create a symmetric bimorph deformable mirror. If a flexi-circuit 8 is used it will not have the same thermal expansion properties as the PZT plates. However, the symmetry of the overall structure, and the parallel polishing process, will reduce thermally induced distortions. There may be a reduction in sensitivity of the bimorph since the soft flexi-circuit does not efficiently couple the two PZT plates. However, the convenience, low cost and ease of manufacture of this embodiment may outweigh this potential problem.

Figure 12:
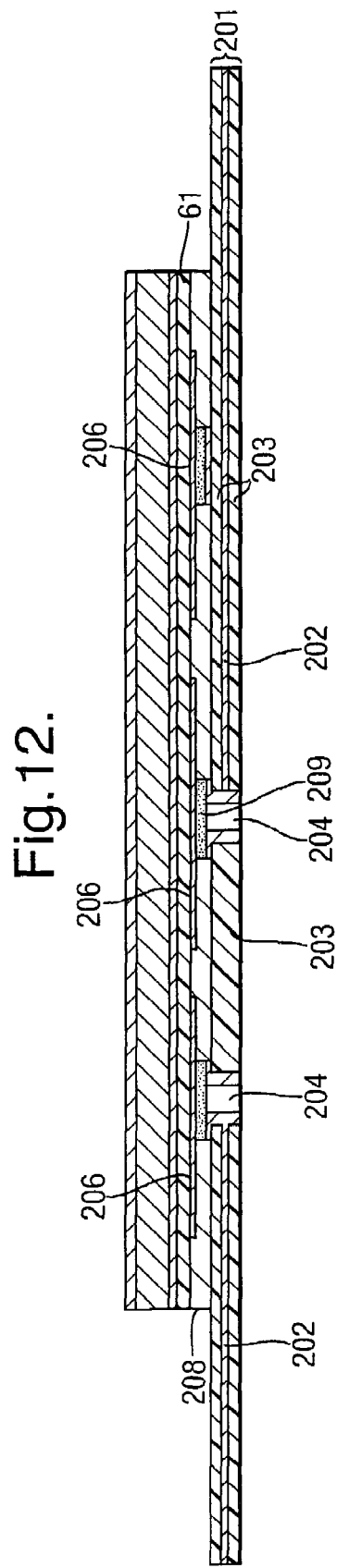
FIG. 12 is a cross-sectional view of a fifth embodiment of the invention showing diagrammatically the use of a flexi-circuit to connect to the mirror electrodes.

FIG. 12 shows a fifth embodiment of the invention in which a flexi-circuit 201 is used to provide the passivation layer. The flexi-circuit 201 comprises conducting copper tracks 202 set in a polyimide substrate 203. As manufactured, flexi-circuit 201 is provided with conducting copper tracks 202 that terminate at vias 204 drilled through the plane of the flexi-circuit. To facilitate electrical connection, vias 204 are plated with a conducting material. The copper tracks 202 and vias 204 are formed in a predetermined pattern such that the flexi-circuit 201 can provide an electrical connection to each of the electrodes 206 on the underside of PZT plate 61. In the embodiment shown in FIG. 12, a copper track is provided by the flexi-circuit 201 for each of the electrodes 206 on the underside of the PZT plate 207, such that a copper track extends from each electrode to a contact that may conveniently be connected to an external mirror driver (not shown). The flexi-circuit 201 is bonded to the PZT plate 61 using a three-stage process. Firstly, it is held in place, at a fixed distance from the electrodes 206, using spacers. Secondly, a glue-writer is used to inject a conductive epoxy into each via such that each electrode is connected to a desired conducting track in the flexi-circuit by conducting epoxy, as indicated at 208. Thirdly, a low viscosity, non-conducting epoxy 209 is used to fill the remaining gaps between the flexi-circuit 201 and the PZT disc 61, and to increase the mechanical strength of the bond between the PZT disc 61 and the flexi-circuit 201.

As will be readily apparent to those skilled in the art, it is not necessary for deposition techniques to be used to form a separate passivation layer in the embodiment described above with reference to FIG. 12. Passivation is provided primarily by the polyimide component 203 of the flexi-circuit in which the conducting copper tracks 202 are embedded. Thus it will be understood that the layer of polyimide indicated generally at 203 in FIG. 12, between the conducting track 202 and electrode 206 provides the passivation layer in this embodiment. This results in a quicker and simpler manufacturing process, since the need for a deposition stage in the manufacture of the mirror is obviated. Furthermore, the flexi-circuit 201 provides a direct interconnect between the electrodes 206 on the PZT plate 61 and the external mirror driver (not shown), further simplifying the manufacture process.

FIGS. 13 to 18 show embodiments of the invention in which the mirror is supported from below by a compliant support structure. Similar compliant support structures are described in the Applicant's co-pending UK Patent Application No. 0412851.8. In each embodiment, there is an electro-restrictive PZT plate 61 on which electrodes are formed, and a compliant disc 60 that supports the mirror structure.

Figure 13:
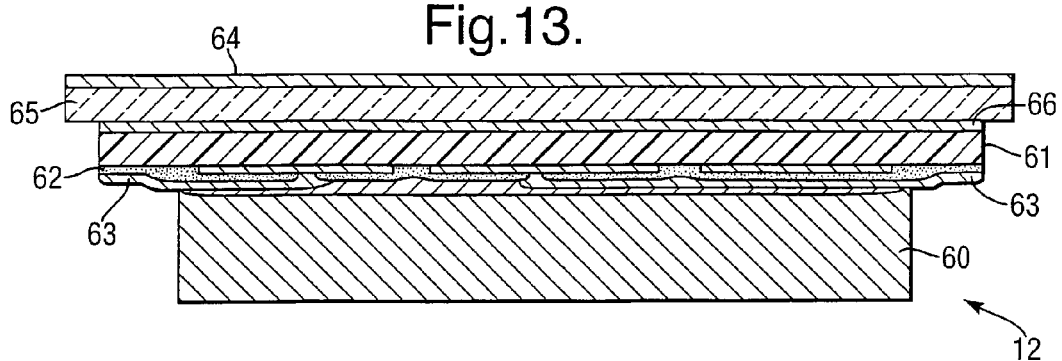
FIG. 13 is a cross-sectional view of a sixth embodiment of the invention in which the mirror is supported from below.

FIG. 13 shows a sixth embodiment in which a set of electrodes 62 is beneath the PZT plate 61. A passivation layer is applied using deposition techniques as described above such that the compliant support 60 can support the mirror 12 from below, whilst contact pads 63 are located around the lower rim of the PZT disc 61. Connection to the mirror 12 can then be made at its periphery. The mirror surface 64 is formed above a passive substrate 65 (that may be, for example, glass). There is a common electrode 66 between the passive substrate 65 and the PZT disc 61. The passive substrate 65 slightly overlaps the PZT disc 61.

Figure 14:
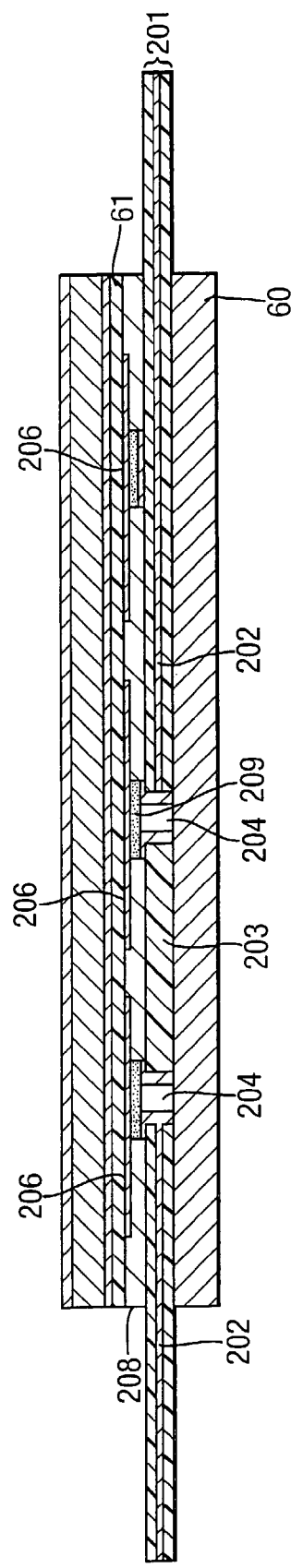
FIG. 14 is a cross-sectional view of a seventh embodiment of the invention, that is similar to the sixth embodiment shown in FIG. 13.

FIG. 14 shows a seventh embodiment of the invention that is similar to the embodiment shown in FIG. 12. Like parts in these two Figures are referenced alike, and are not described further. The seventh embodiment, shown in FIG. 14, includes a compliant support 60 to support the mirror structure as described above with reference to FIG. 13.

Figure 15:
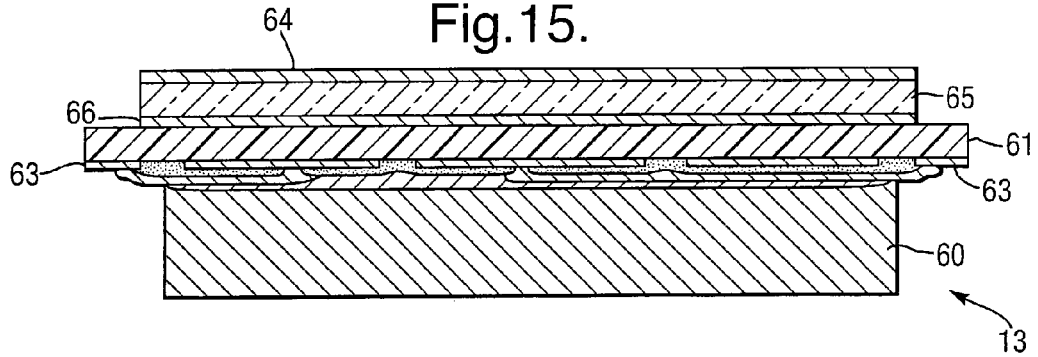
FIG. 15 is a cross-sectional view of a eighth embodiment in which the mirror is supported from below.
Figure 16:
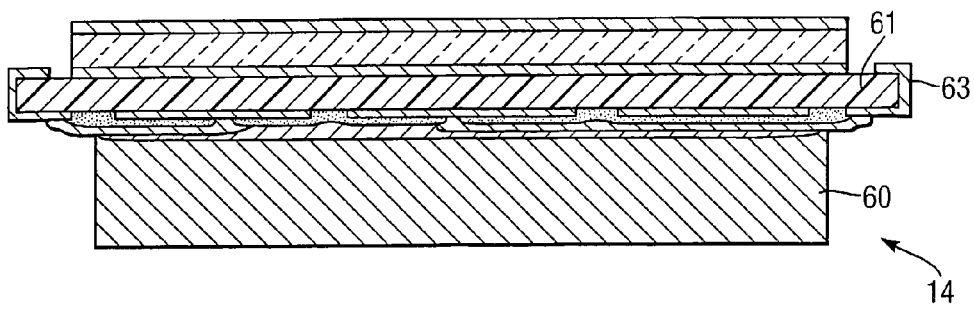
FIG. 16 is a cross-sectional view of a ninth embodiment of the invention in which the mirror is supported from below.

FIG. 15 shows a mirror 13 according to an eighth embodiment that is similar to the sixth embodiment shown in FIG. 13. However, in the embodiment of FIG. 15 the PZT disc 61 is larger than the passive substrate 65 so that connections to the periphery of the mirror are facilitated since the contact pads 63 can be moved outwards. Note that the common electrode 66 does not extend beyond the passive substrate 65 and does not overlap the contact pads 63, so that there is no net electric field around the rim of the PZT disc. FIG. 16 shows a ninth embodiment of the invention that is similar to the eighth. In the ninth embodiment, the contact pads 63 have been wrapped around the periphery of the disc such that connection to the mirror 14 can be made from the top.

Figure 17:
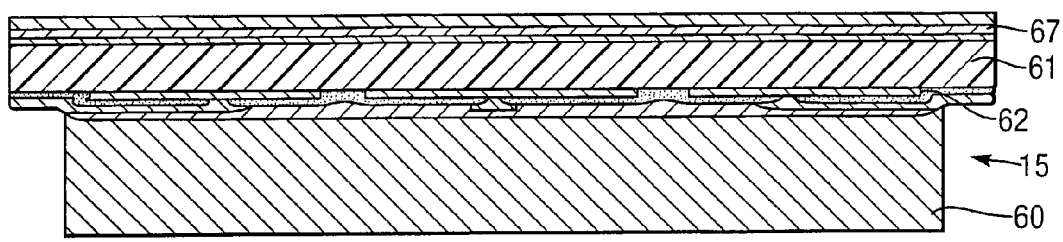
FIG. 17 is a cross-sectional view of an tenth embodiment of the invention in which the mirror is supported from below.

FIG. 17 shows a tenth embodiment in which the compliant support 60 is used as the passive substrate. A thin planarization layer 67 is applied to the common electrode 66 on the top surface of the PZT plate 61. The lower surface is passivated to enable connections to external drivers to be made at the periphery. Alternatively, the common electrode 66 could be placed at the bottom surface of the PZT plate 61 (in which case there would be no need to passivate the lower surface) and the set of electrodes 62 at the top. The upper surface in this case would need to be both passivated and planarised.

Figure 18:
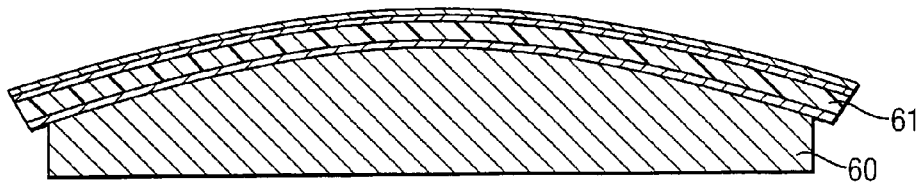
FIG. 18 is a cross-sectional view of an embodiment of the invention schematically showing a deformation of the mirror.

FIG. 18 shows an exaggeration of the deformation that would result if an equal field were to be applied to each electrode in the electrode array 62 of the mirror 15. For clarity, the set of electrodes, the passivation layer and the planarization layer have been omitted from the figure.

A preferred embodiment of the present invention will now be described with reference to FIG. 19 in which strain gauges are provided to give information about the deformation of the mirror. This information may be used by an associated mirror control system to take account of hysteresis effects that are known to occur in piezo-electric materials.

Figure 19:
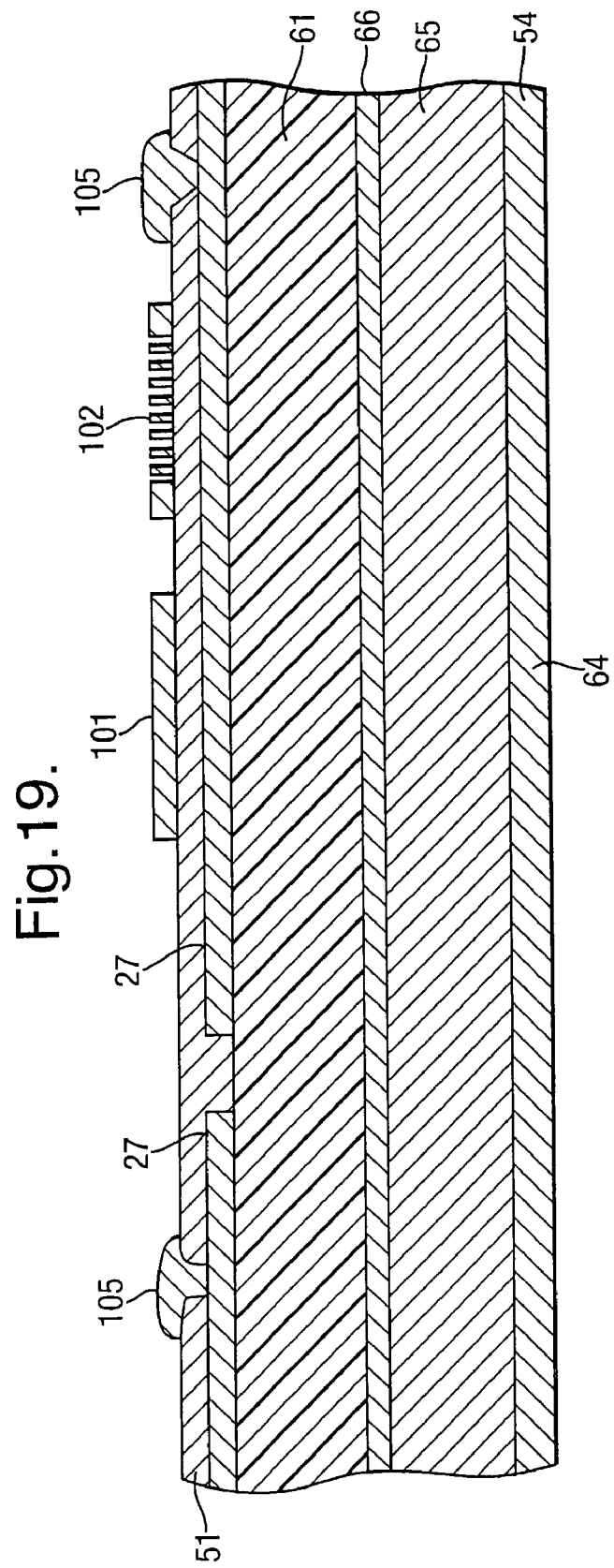
FIG. 19 is a cross-sectional view of a section of a mirror according to a preferred embodiment of the present invention showing the addition of strain gauges.

Referring to FIG. 19, a portion of a preferred mirror is shown in cross-section. In common with the embodiments shown in FIGS. 13 and 15 above, for example, a common electrode 66 is provided on one side of a PZT layer 61 between the PZT layer 61 and a layer of passive substrate 65. On the other side of the PZT layer 61 are provided electrodes 27 over which a passivation layer 51 has been deposited. Vias 105 have been created through the passivation layer 51 to enable electrical connections to be made to the underlying electrodes 27. Resistive strain gauges 101 and 102 are shown, provided on the passivation layer 51 in the region overlying one of the electrodes 27 to enable strain and hence deformation of the mirror in that region to be detected and measured, for example as a result of energising the respective electrode 27.

In an alternative arrangement, not shown in FIG. 19, a further passivation layer may be provided between the common electrode 66 and the layer of passive substrate 65 so that resistive strain gauges may be provided within that further passivation layer rather than, or in combination with, strain gauges 101, 102 provided as shown in FIG. 19. Within the further passivation layer, being closer to the reflective surface 64 of the mirror, strain gauges so positioned are able to provide strain information more representative of the deformation occurring at the reflective surface 64. A flexi-connector of a type similar to that shown in FIG. 8 may be included on or within the further passivation layer to enable electrical connection to be made to each of the strain gauges deposited therein from outside the mirror.

Figure 20:
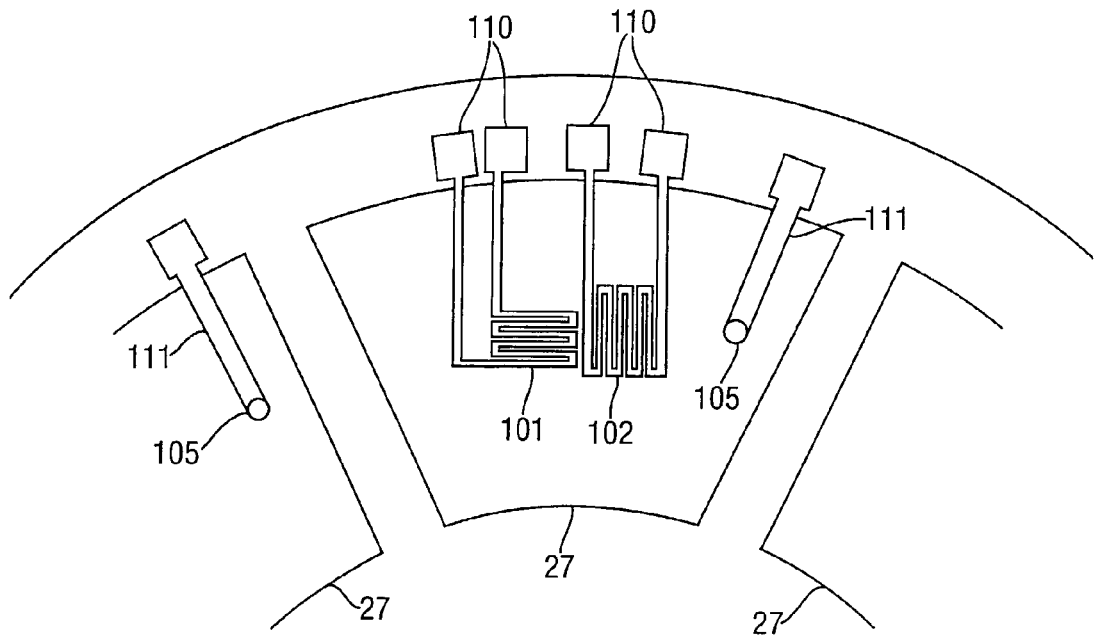
FIG. 20 is a diagram of a portion of a mirror in the region of an electrode showing the position of strain gauges and electrical connection pads in a preferred embodiment of the present invention.

Referring to FIG. 20, a preferred arrangement is shown in which a pair of orthogonally positioned resistive strain gauges 101, 102 are deposited on or within a passivation layer overlying an electrode 27. In the particular example shown in FIG. 20, the electrode 27 is located close to the outer edge of a mirror and this enables electrical connections to the strain gauges 101, 102 to be extended to peripheral bond pads 110. Electrical connection 111 to the electrode 27 itself may be made at a convenient point on the electrode 27 by means of a via 105 provided through the passivation layer. However, as described above, all electrical connections to electrodes and to strain gauges may preferably be extended to bond pads around the perimeter of the mirror using flexi-connectors.

It has been found that the surface profile of a deforming mirror may be measured more effectively using two orthogonally disposed strain gauges 101, 102, as shown in FIG. 20, in the region of each electrode 27. This is because the local curvature of a mirror will be influenced by the states of neighbouring electrodes. In some circumstances, especially where the electrode shapes are square or hexagonal, it may be possible to only use one gauge, which could be in the form of a double spiral.

Figure 21:
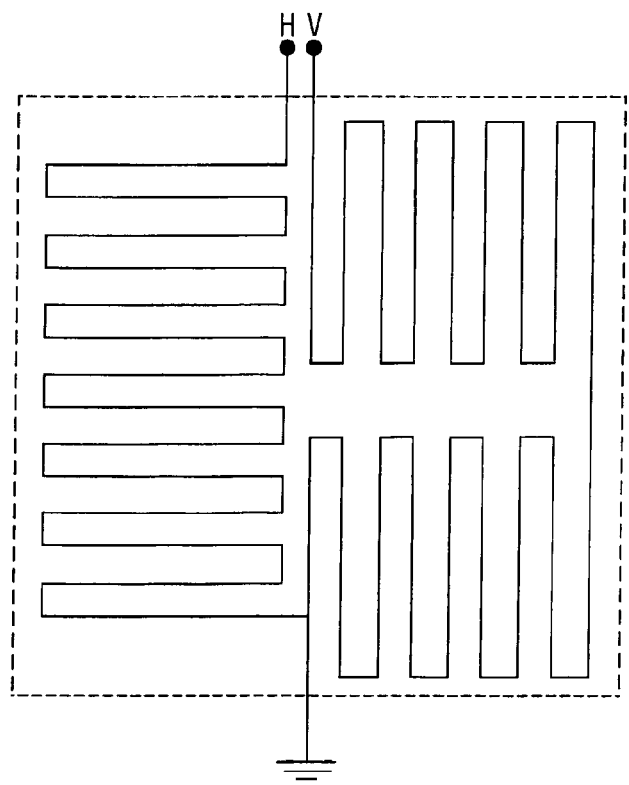
FIG. 21 shows a preferred layout for a pair of strain gauges.

FIG. 21 shows an optional arrangement for the two orthogonal gauges 101, 102 of FIG. 20, where they are required to fit into a square area. A potential option of sharing a common contact is also shown. Use of this type of strain gauge pair would advantageously reduce the number of electrical connections required.

The deposition layer, including the passivation layer 51 and the planarization layer 54 are applied using thin film deposition techniques. The main thin film deposition techniques fall into three categories as will be described hereinafter: spin coating, Chemical Vapour Deposition (CVD) and Physical Vapour Deposition (PVD).

Spin coating is a widely used process for applying a thin film to a flat substrate. A small quantity of a polymer solution is dispensed onto the centre of a clean substrate. The substrate is then rotationally accelerated to a high speed, typically 2000-5000 rpm. The spinning causes most of the solution to be ejected from the substrate, leaving a thin film which flows outwards from the centre of the substrate under centrifugal forces. After spinning the thin film must be thermally cured into a smooth structural layer. Since the polymer is applied in liquid form, these materials tend to fill narrow gaps in the sub-dielectric surface and produce a good degree of planarization.

Polyimides can be deposited in this way. Polyimides produce films which have excellent thermal stability, toughness and chemical resistance. Polyimides can be built up into thick films and are suitable for passivation or planarization layers. However, a low temperature curing polymer is advantageous so as to ensure that the PZT does not need to be re-poled after the application of the dielectric.

All PVD techniques require the deposition to be carried out in a vacuum chamber. A good vacuum is required to increase the mean free path for collisions of atoms and high-energy ions. A source material is heated in a high vacuum such that its vapour pressure exceeds that of its environment and it is quickly vaporised. The substrate to be coated is placed in close vicinity of the source material. Upon contacting the cooler surfaces of the substrate the vapour condenses thereby creating a thin film of source material on the substrate.

One possible method for heating the source material is to place it in a boat wrapped with high resistance wire and apply a current through the wire. This is known as thermal, or resistive, evaporation. Flash evaporation can be used to deposit alloys. Small portions of an alloy powder are placed on a vibrating incline such that they fall into a boat that is kept at sufficiently high temperature to vaporise all the constituents as soon as they contact the boat. Electron beam evaporation can be used to deposit refractory metals and dielectrics. In this case an e-beam is focussed on the source material causing it to heat and vaporise.

The above PVD techniques deposit films in a 'line of sight' manner. For large substrates the uniformity of the film thickness will be poor. The deposition of thick films is possible, although a large amount of source material may be required.

Sputtering is a special case of PVD in which a target of the source material is bombarded with highly energetic positive ions. These ions cause ejection of particles from the target. The 'sputtered' particles deposit as thin films on substrates that have been placed on an anodic or grounded holder.

For DC sputtering, a diode or parallel plate system is used. The material to be sputtered is attached to the cathode plate while the substrate is placed on a facing plate which is either positively charged or grounded. An argon plasma is generated between the plates. Argon ions in the plasma are attracted to the cathode where they strike the target with sufficient energy to sputter particles of the target material. During this process highly energetic secondary electrons are emitted which create more positively charged Ar ions so that the plasma is self-sustaining.

The DC sputtering process is limited to electrically conductive targets. RF sputtering, where the target is subjected to alternating positive ion and electron bombardment, is used for non-conducting targets. RF sputtering can be used to deposit metals, alloys and almost any dielectric materials at low temperature and pressure, and a film of the thickness required for the passivation or planarization layers of a mirror according to an embodiment of the invention would be easily achievable.

Chemical vapour deposition occurs under a wide range of conditions. Deposition temperatures vary from 100° C. to 1000° C. and pressures from atmospheric to $10^{-2}$ Torr. The energy for the reaction can be supplied thermally, by photons or by a glow discharge.

For atmospheric CVD, the substrate lies on a heater and reactant gasses flow over the surface at high velocity. The film is formed by chemical reactions at the substrate surface. Recently this process has been improved with low pressure hot wall reactors in which a more uniform film can be achieved at lower temperatures, typically 100-500° C.

A variant involves striking a plasma to enhance the chemical reaction rates of the precursor gasses. Plasma enhanced CVD (PECVD) allows deposition at lower temperatures with excellent control over the film properties. However the reducing atmosphere of the deposition chamber may deleteriously affect the composition of the PZT.

The two most suitable deposition techniques for forming the deposition layer are spin coating polyimide and RF sputtering. Both can achieve a uniform film with relatively low stress in the thickness range required. In addition, the stress of the sputtered film can be reduced by depositing alternate films with compressive and then tensile stress to build up a stress-free final film. PZT has a maximum working temperature of just over 100° C. At higher temperatures it will de-pole. Re-poling is possible, but the overall process will be simpler and quicker if high temperatures can be avoided. The RF sputtering process is performed at sufficiently low temperatures to avoid re-poling, but the polyamide would have to be carefully chosen to be curable at low temperatures.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A controllably-deformable mirror comprising: a first electro-restrictive plate; a mirror surface; a set of electrodes defined as regions on a first surface of the first electro-restrictive plate, the set of electrodes comprising a first electrode and a second electrode; a common electrode on a second surface of the first electro-restrictive plate;
    a set of contacts removed from the set of electrodes, the set of contacts including a first contact electrically connected to the first electrode and a second contact electrically connected to the second electrode;
    a set of conducting tracks to electrically connect the set of electrodes to the set of contacts;
    and a passivation layer interposed between the set of conducting tracks and the set of electrodes and adapted to mutually insulate the set of electrodes.

2. A controllably-deformable mirror as claimed in claim 1 wherein the set of contacts are positioned such that an external mirror-driver operable to apply voltages to the electrodes can be interchangeably electrically connected to the set of contacts.

3. A controllably-deformable mirror as claimed in claim 1, wherein the passivation layer and the set of conducting tracks are provided by a flexi-circuit.

4. A controllably-deformable mirror as claimed in claim 3 wherein the flexi-circuit comprises a first portion shaped to correspond with the shape of the first electro-restrictive plate and a second portion extending from the mirror to provide the set of contacts, the first portion being adapted to provide a passivation layer.

5. A controllably-deformable mirror as claimed in claim 1, further comprising a second electro-restrictive plate attached to the first electro-restrictive plate such that the passivation layer is interposed between the first and second electro-restrictive plates.

6. A controllably-deformable mirror as claimed in claim 1, wherein the passivation layer comprises a polyimide.

7. A controllably-deformable mirror as claimed in claim 1, wherein the passivation layer comprises a deposition layer.

8. a controllably-deformable mirror as claimed in claim 7 wherein the contacts are arranged in a peripheral region of the mirror at or near the circumference of the first electro-restrictive plate.

9. A controllably-deformable mirror as claimed in claim 7, wherein the mirror surface is on the first surface of the first electro-restrictive plate.

10. A controllably-deformable mirror as claimed in claim 9 wherein the passivation layer is interposed between the mirror surface and the first surface of the electro-restrictive plate.

11. A controllably-deformable mirror as claimed in claim 7, further comprising a second electro-restrictive plate, wherein the deposition layer is interposed between the first and second electro-restrictive plates.

12. A controllably-deformable mirror as claimed in claim 9, wherein the deposition layer comprises silicon dioxide.

13. A controllably-deformable mirror as claimed in claim 12 wherein the deposition layer is between 16μm and 20μm thick such that it is able to hold off a potential difference across it in the range 800V to 1000V.

14. A controllably-deformable mirror as claimed in claim 7, further comprising a flexi-circuit to electrically connect the contracts to the mirror driver.

15. A controllably-deformable mirror as claimed in claim 1, further comprising a planarization layer.

16. A controllably-deformable mirror as claimed claim 15 wherein the planarization layer comprises a deposition layer.

17. A controllably-deformable mirror as claimed in claim 15, herein the planarization layer comprises any one of silicon dioxide and silicon nitride.

18. A controllably-deformable mirror as claimed in any claim 15, wherein the thickness of the planarization layer is in the range 5μm to 30μm.

19. A controllably-deformable mirror according to claim 1, further comprising a plurality of strain gauges provided in association with a layer of the mirror to provide information relating to deformation of the mirror.

20. A controllably-deformable mirror according to claim 19, wherein each of said plurality of strain gauges are provided in regions of the mirror associated with electrodes.

21. A controllably-deformable mirror according to claim 19, wherein said plurality of strain gauges comprise strain gauges arranged as substantially mutually orthogonal pairs.

22. A controllably-deformable mirror according to claim 19, wherein at least one of said plurality of strain gauges is in the form of a double spiral.

23. A controllably-deformable mirror according to claim 19, wherein said plurality of strain gauges are deposited on or within a passivation layer of the mirror.

24. A controllably-deformable mirror according to claim 23, wherein said passivation layer is provided between an electro-restrictive layer and a planarization layer of the mirror.

25. A controllably-deformable mirror as claimed in claim 1, mounted in a deformable-mirror holder.

26. A controllably-deformable mirror as claimed in claim 25 wherein the deformable-mirror holder comprises a support structure adapted to support the mirror from below.

27. A method of manufacturing a controllably-deformable mirror having an electro-restrictive plate, comprising the steps of:
  defining a set of electrodes, comprising a first electrode and a second electrode, on a first surface of the electro-restrictive plate;
  depositing a passivation layer adapted to mutually insulate the set of electrodes; and
  applying a mirror surface; and arranging a set of contact pads in a peripheral region of the mirror, the set of contact pads comprising a first contact pad electrically connected to the first electrode, and a second contact pad electrically connected to the second electrode.

28. a method as claimed in claim 27, wherein the step of depositing a passivation layer comprises depositing a passivation layer on the first surface of the electro-restrictive plate.

29. A method as claimed in claim 27, wherein the step of applying a mirror surface comprises applying a mirror surface to the first surface of the electro-restrictive plate.

30. A method as claimed in claim 29 wherein the passivation layer comprises silicon dioxide.

31. A method as claimed in claim 30 wherein the passivation layer is between 16μm and 20μm thick.

32. A method as claimed in claim 27, further comprising the step of depositing a planarization layer.

33. A method as claimed in claim 32 wherein the planarization layer comprises silicon nitride.

34. A method as claimed in claim 33 wherein the as-deposited planarization layer is between 21μm and 30μm thick.

35. A method as claimed in claim 32, wherein the mirror surface is applied to the planarization layer.

36. A method as claimed in claim 32, wherein the step of applying a mirror surface to the layer comprises the step of grinding and polishing the planarization layer to optical flatness.

* * * * *